Sept. 9, 1930.   A. C. MACBETH   1,775,205
PISTON RING FOR INTERNAL COMBUSTION ENGINES
Filed April 9, 1929
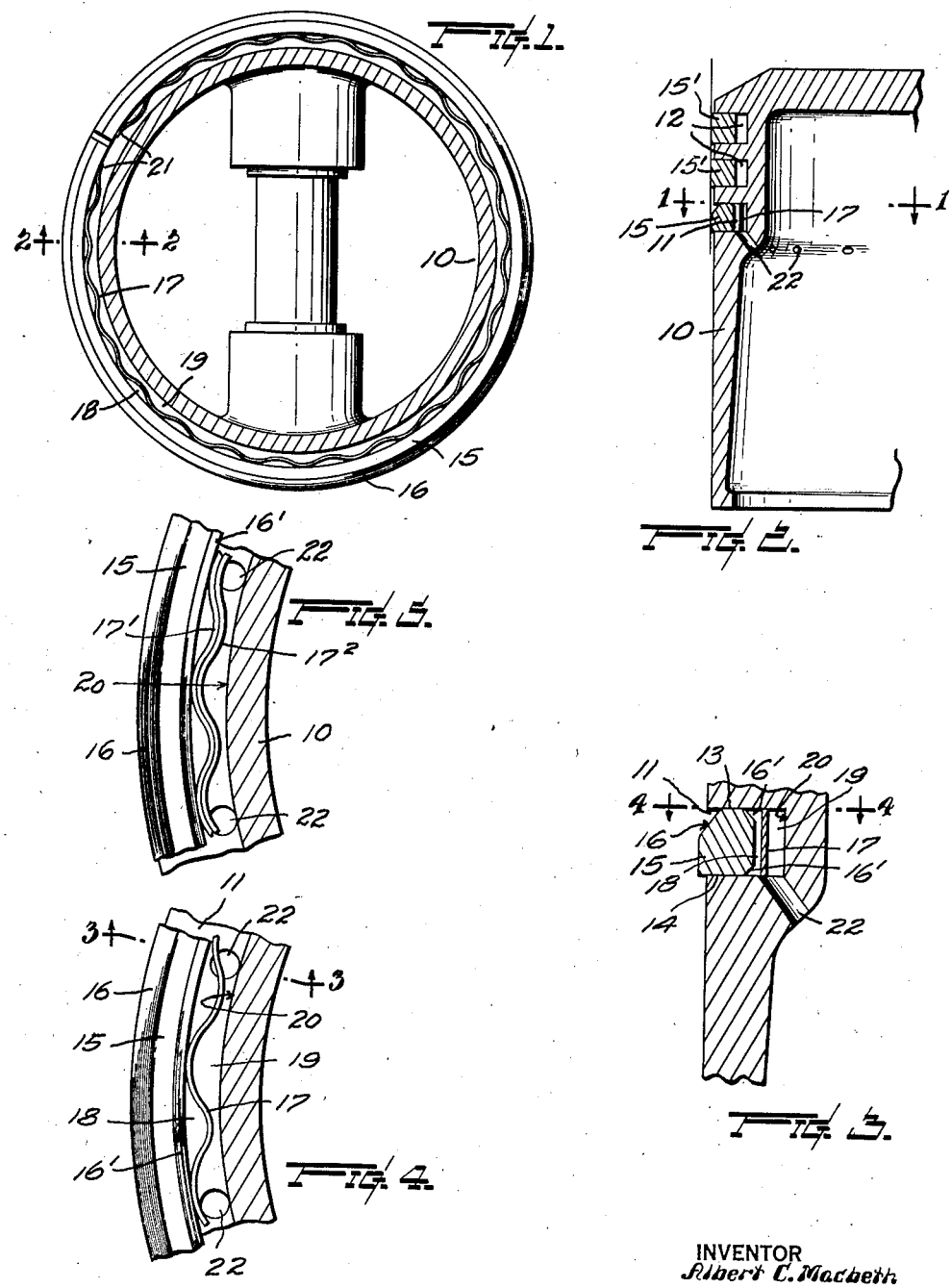
INVENTOR
Albert C. Macbeth
BY
ATTORNEY Patented Sept. 9, 1930

1,775,205

UNITED STATES PATENT OFFICE

ALBERT C. MACBETH, OF SEATTLE, WASHINGTON

PISTON RING FOR INTERNAL-COMBUSTION ENGINES

Application filed April 9, 1929. Serial No. 353,864.

This invention relates to pistons for internal combustion engines.

The object of my invention, generally stated, is the perfecting of devices of this character to render the same more efficient in operation which is automatically regulated to exclude or remove superfluous lubricating oil from the combustion chamber of the cylinders of the engine.

More specific objects and advantages of the invention will appear in the following description.

The invention consists in the novel construction, adaptation and combination of parts hereinafter described and claimed.

In the accompanying drawing,—

Figure 1 is a horizontal transverse section on line 1—1 of Fig. 2 of the piston of an internal combustion engine embodying my improvements; Fig. 2 is a vertical transverse section on line 2—2 of Fig. 1; Fig. 3 is a detail transverse vertical section to an enlarged scale taken on line 3—3 of Fig. 4; Fig. 4 is a detail sectional view on line 4—4 of Fig. 3; and Fig. 5 is a view similar to Fig. 4 illustrating a modification thereof.

As shown, the reference numeral 10 represents a piston for an internal combustion engine having a plurality of peripheral grooves 11 and 12 with parallel upper and lower surfaces 13 and 14, respectively. Provided within said grooves are steel or other spring metal rings 15 and $15^1$ of the step-cut type, the widths of the rings being equal to the widths of the respective grooves, or nearly so.

The lower piston ring 15, with which the present invention is concerned, is chamfered exteriorly to provide a truncated conical surface 16 thereon which, in the upward travel of the piston, tends to dislodge oil from the sloping upper surface of the referred to ring.

The piston ring interiorly is chamfered at both its upper and lower edges as denoted by $16^1$.

Provided within the groove 11 is a thin strip, or ribbon, 17 which is corrugated circumferentially of the piston partitioning the groove 11 into two circular cavities 18 and 19, peripherally of the ring receiving space.

The fluting of the ribbon strip 17 is arranged to have the ridges and concavities thereof extend from the top to the bottom of the groove 11.

As shown in Fig. 1, the extremities 21 of the corrugated strip 17 are disposed in spaced apart relation permitting the strip to elongate and contract without the ends interfering with each other.

Drainage holes such as 22 are provided in the groove 11 for the passage of oil between the spaces at either side of the partition.

In practice, the bore of the cylinder varies in diameter from one end to the other permitting the piston ring 15 to expand in its up-stroke and contract during its down-stroke; the ring being thus affected, causes the strip 17 to be correspondingly influenced whereby the space or spaces provided by the formation and size of the strip 17 outside of the partition remain substantially constant, whereas the inner space is enlarged and reduced in size during the travel of the piston in its successive strokes.

The invention, furthermore, is characterized by the employment of a partition which is always in contact with the piston ring and out of contact with the inner wall 20 of the piston groove and provides cavities of unequal capacities interiorly and exteriorly of the piston ring.

The capacity of the outer cavity 18 remains substantially the same, whereas the cavity 19 within the ring varies as the partition expands and contracts responsive to corresponding changes in the diameter of the piston ring in the travel of the piston.

When an iron ring is employed with a piston constructed at a metal, as alluminum for instance, having a coefficient of expansion different from such metal, the strip may be made of two plies $17^1$ and $17^2$ Fig. 5 of which but one ply, having the proper degree of expansibility, need fit but one of the grooves to maintain the strip practically leak proof against the passage of oil under different temperatures.

In operation, the space between the partition ring 17 and the piston ring remains substantially constant with no suction value during the upstrokes of the piston, and is enlarged during the down strokes with no change in pressure value, thus allowing the oil to drain freely from the piston ring groove through the drain holes without being hampered by opposing suction or pressure of the oil due to the expansion and contracting of the piston ring.

The invention and the manner of its operation will, it is thought be understood from the foregoing description.

What I claim, is:—

1. In a piston having a peripheral groove provided with oil-draining holes, and an expansible piston ring mounted in said groove, a partition extending peripherally of the piston in said groove to divide the same into two concentric radially arranged spaces, the outer of said spaces being of substantially a constant volume, and the volume of the inner space changing with the expansion and contraction respectively of the piston ring.

2. In a piston having a peripheral groove provided with oil-draining holes, and an expansible piston ring extending into said groove circumferentially thereof, a partition arranged within the groove interiorly of the inner peripheral surface of said ring, said partition being in continuous contactual relation with the said ring and in spaced relation with the peripheral surface of the groove.

3. In a piston as defined in claim 2 wherein the partition is corrugated to provide successive circumferentially spaced contacts between the partition and the ring.

4. In a piston as defined in claim 2, wherein the partition is corrugated to provide a series of cavities between the ring and the partition circumferentially thereof, an inner edge of the ring being chamfered to provide a passage between all of said cavities.

5. A piston having a groove for a piston ring, a partition extending circumferentially about the piston in contactual engagement to the upper and lower walls of said groove, said partition being movable bodily toward and from the inner periphery of the groove in the contractile and expanding movements, respectively, of the ring.

6. A piston provided with a circumferential groove having parallel upper and lower surfaces, a piston ring in the groove, a partition comprising a two-ply strip corrugated of metal provided in the groove, the plies of said strip having different coefficients of expansion, said partition being adapted to expand and contract with the piston ring, and be at all times out of contact with the inner periphery of the piston-ring groove.

7. A piston provided with an automatic oil-draining system, comprising an expansible piston ring, a partition in the groove for said ring, said partition extending circumferentially about the piston in contact with the piston-ring and in spaced relation with the peripheral surface of the groove, said oil draining system comprising holes extending from the piston groove at both sides of the partition.

8. A peripherally grooved piston comprising the following cooperative elements: an expansible piston ring, a partition contactually engaging the upper and lower wall surfaces of the groove of said piston and dividing the same into two compartments of different suction values responsive to the expansion and contraction of the ring in its successive strokes.

Signed at Seattle, Washington, this 2nd day of April, 1929.

ALBERT C. MACBETH.